United States Patent [19]

Remmington

[11] 4,092,289

[45] May 30, 1978

[54] POLYESTER COMPOSITION

[75] Inventor: Timothy Alan Remmington, Hertford, England

[73] Assignee: Imperial Chemical Industries Limited, United Kingdom

[21] Appl. No.: 720,665

[22] Filed: Sep. 7, 1976

Related U.S. Application Data

[63] Continuation-in-part of Ser. No. 487,761, Jul. 11, 1974, abandoned.

[30] Foreign Application Priority Data

Jul. 25, 1973 United Kingdom ............... 35364/73

[51] Int. Cl.$^2$ ........................... C08K 3/22; C08K 3/36
[52] U.S. Cl. ................................ 260/40 R; 260/40 P; 260/DIG. 35
[58] Field of Search ............ 260/40 P, 40 R, DIG. 35

[56] References Cited

U.S. PATENT DOCUMENTS

| 2,819,173 | 1/1958 | Dithmar ......................... 260/40 P X |
| 3,002,942 | 10/1961 | Zoetbrood ....................... 260/40 P |
| 3,221,226 | 11/1965 | Kennedy et al. ............... 260/40 P X |
| 3,821,156 | 6/1974 | Farrar ........................... 260/DIG. 35 |

FOREIGN PATENT DOCUMENTS

| 278,057 | 12/1963 | Australia. |
| 427,261 | 12/1968 | Australia. |
| 1,068,018 | 5/1967 | United Kingdom. |
| 1,090,036 | 11/1967 | United Kingdom. |

*Primary Examiner*—Sandra M. Person
*Attorney, Agent, or Firm*—Cushman, Darby & Cushman

[57] ABSTRACT

Polyester compositions suitable for the production of oriented films contain filler agglomerates of mixtures of primary inert particles having opposite electrical charges in polar media, preferably pyrogenic alumina and pyrogenic silica. The preferred particles give optically clear films and the presence of alumina aids filtration.

12 Claims, No Drawings

POLYESTER COMPOSITION

This application is a continuation-in-part application of Ser. No. 487,761 filed July 11, 1974, and now abandoned.

The present invention relates to compositions of synthetic polymeric materials such as linear polyesters, e.g. polyethylene terephthalate, containing inert particulate materials, and to shaped articles, especially films, formed therefrom.

Inert particulate materials are often added to polymeric materials to confer low surface friction characteristics upon shaped articles made from them. Thus films of polymeric materials such as polyethylene terephthalate contain added particles to promote their so-called "slip" properties so as to improve handling and reeling performance. Added particles having a mean particle size of the order of 0.1 to 20 microns provide satisfactory slip properties but tend to impair the clarity of shaped articles such as oriented films because voiding can occur around the particles.

It has also been proposed to incorporate into polymer compositions inert particles having a smaller mean primary particle size but which agglomerate into larger secondary particles which function to provide the desired slip properties. It has however been found that the agglomerates tend to collect in and diminish the efficiency of filters in polymer making and extrusion systems. According to the present invention a composition of a linear polyester comprises the linear polyester and from 0.01 to 10.0% by weight of the total composition of an inert particulate additive comprising at least two particulate materials each having a mean primary particle size of up to 100 millimicrons, at least two of the particulate materials possessing opposite electrical charges in a polar system.

By "the mean primary particle size" of the particulate materials we refer to the mean particle size of the materials in an unagglomerated form and not to the size of secondary agglomerates which develop. The mean particle size of these primary particles is the arithmetic mean of the particle diameters and may be measured by electron microscope techniques.

In addition to the presence of secondary agglomerated particles which may be formed from like primary particles, e.g. as a result of physical compacting or physical or chemical attraction, agglomerates may also be formed as mixtures of the oppositely charged particles and as a result of the opposite charges.

The linear polyester may be produced by condensing one or more dicarboxylic acids or a lower alkyl diester thereof with one or more glycols of the formula $HO(CH_2)_nOH$ where $n$ is 2 to 10 inclusive. Suitable dicarboxylic acids include terephthalic acid, isophthalic, phthalic, 2,5-, 2,6- or 2,7-naphthalene dicarboxylic acid, succinic acid, sebacic acid, adipic acid, azelaic acid, bibenzoic acid, hexahydroterephthalic acid. Bis-p-carboxy phenoxy ethane may alternatively be condensed with one or more glycols of the nature mentioned above. Suitable glycols include ethylene glycol, 1,3-propanediol, 1,4-butanediol, neopentyl glycol and 1,4-cyclohexane-dimethanol. It is to be understood that a copolyester of any of the above materials may be used. The preferred polyester is polyethylene terephthalate, which is derived from terephthalic acid and ethylene glycol.

The linear polyesters, including polyethylene terephthalate may be produced by processes which are known in the art, e.g. by direct esterification or ester-interchange followed by polycondensation.

The inert particulate materials are preferably pyrogenic materials which can be formed with fine mean primary particle sizes of up to 100 millimicrons. Suitable materials include pyrogenic silica, alumina and titanium dioxide. These materials may be formed respectively by the high temperature flame hydrolysis of silicon tetrachloride, aluminium chloride and titanium tetrachloride. Pyrogenic silica and alumina typically have a mean particle size of 5 to 40 millimicrons. Pyrogenic silica has a negative surface charge and pyrogenic alumina a positive surface charge and these charges promote the formation of secondary agglomerate particles of mixtures of the two which impart useful slip properties to shaped articles such as uniaxially and biaxially oriented and heat set films made from polyester compositions containing them. Pyrogenic alumina alone does not provide good slip properties.

The composition should contain from 0.01 to 10.0% by weight of the admixture of primary particles to provide adequate slip properties and permit convenient processing. Generally, satisfactory properties are obtained when the composition contains from 0.05 to 0.5% by weight of the particle admixture, preferably about 0.15%.

As stated above, compositions produced with a particulate mixture of pyrogenic silica and alumina provide useful slip properties in shaped articles such as films produced from the compositions. The total particulate additive may contain 5 to 95% by weight of pyrogenic silica and correspondingly 95 to 5% by weight of pyrogenic alumina. Low amounts of pyrogenic alumina, e.g. in the range of 10 to 20% by weight, have been found to facilitate processing and filtration. Higher amounts of pyrogenic alumina also provide similar improvements in processing and filtration but additionally provide compositions and shaped articles of improved optical clarity. Therefore, when optical clarity is important it is preferred to employ an amount of pyrogenic alumina in the range 30 to 95% by weight of the total particulate additive. Equal amounts of pyrogenic silica and alumina provide good processing and filtration characteristics and optical clarity, especially in polyethylene terephthalate.

These results with pyrogenic silica/alumina admixtures are obtainable when the composition contains from 0.05 to 0.5% by weight, especially 0.15% by weight, of the additive admixture.

The compositions of this invention may be produced by any known processes of incorporating particulate materials into linear polyesters. For instance, the mixture of particulate materials may be slurried with glycol and then added to the polycondensation mixture from which the polyester is produced. Polycondensation may be effected in a conventional manner and may be preceded by a conventional direct esterification or ester interchange step.

The compositions of this invention may be formed into shaped articles by any techniques known in the art for the fabrication of linear polyester articles, e.g. by injection moulding, extrusion and spinning. Fibres and films may especially be made from the compositions of this invention but films are particularly preferred because of the good optical clarity obtainable with certain of the compositions.

Films made from compositions according to this invention may be produced by any suitable known process. A typical process involves melt extruding the polyester composition followed by rapid quenching and molecular orientation by stretching in two mutually perpendicular directions. Such films are normally dimensionally stabilised after stretching by heat setting. A process suitable for molecularly orienting and heat setting polyethylene terephthalate films is described in British Specification 838 708. Suitable conditions involve stretching the film to an extent which is 2.5 to 4.0 times its original dimensions in two directions and heat setting under dimensional restraint at a temperature within the range 190° to 240° C.

The optical clarity of films made from the compositions of this invention is exhibited by biaxially oriented and heat set films made from compositions of polyethylene terephthalate, especially films made with an admixture of pyrogenic silica and pyrogenic alumina. Those films made from the optically clear compositions containing higher amounts of alumina are particularly suitable for metallising by processes such as the vacuum deposition of a thin aluminium coating. The metallised films are clear and bright and devoid of a "bloomed" appearance such as that which is sometimes observed when metallised coatings on films containing conventional particulate materials are viewed at a narrow angle through the film. Such metallised films are suitable for labels, textile threads, mirrors, stamping foils, packaging and general decorative effects and laminates.

The invention is further illustrated by the following example.

EXAMPLE

A mixture of pyrogenic silica and pyrogenic alumina was employed as the particulate additive. The pyrogenic silica had been made by the flame hydrolysis of silicon tetrachloride and had a mean primary particle size of 12 millimicrons, and the pyrogenic alumina by the flame hydrolysis of aluminium chloride and had a mean primary particle size of 30 millimicrons.

Equal parts by weight of the silica and alumina were slurried with ethylene glycol in a ball mill, the overall amount of the two materials being about 5% by weight of the slurry.

The slurry was fed to a conventional polycondensation autoclave together with bis(2-hydroxyethyl)-terephthalate which had been prepared in a conventional manner. The system was condensed in a conventional manner with an antimony trioxide catalyst at a temperature of about 285° C and at a reduced pressure of 0.5 to 1.0 mm of mercury. The amount of slurry employed was chosen to result in a final total particulate additive content of about 0.15% by weight based on the overall weight of the polyethylene terephthalate composition. The filters in the slurry handling systems were not blocked.

The resulting composition was made into film by melt extrusion on to a cooled rotating quenching drum having a polished surface on which the film was rapidly quenching to the amorphous state. The quenched film was stretched firstly in the direction of extrusion and then in the transverse direction about 3.5 times in each direction at temperatures in the region of 100° C. The film was then heat set under dimensional restraint at about 215° C and had a final thickness of 75 microns.

As a control experiment a further batch of polyethylene terephthalate was produced using the same conditions but including 0.15% by weight of a pyrogenic silica only having a mean particle size of 12 millimicrons. The composition was then made into a 75 microns thick biaxially oriented film and heat set by the conditions employed for the film containing the particulate material mixture according to this invention.

Optical and surface friction properties for the experimental and control films were measured with the following results:

| | Experimental film | Control film |
|---|---|---|
| Gardner haze value | 0.8 | 1.9 |
| Total luminous transmission % | 86.9 | 86.2 |
| Coefficient of friction: | | |
| a) static $\mu_s$ | 0.40 | 0.41 |
| b) kinetic $\mu_k$ | 0.39 | 0.39 |

The Gardner haze value is a measure of the haze of the film, lower values representing less cloudiness, and is measured by a standard test which is described in ASTM test method D1003-61.

The total luminous transmission was measured by ASTM test method D1003-61.

The static and kinetic coefficient of friction was measured by the procedure of ASTM test method D1894-63, measurements being obtained for one surface of the film against the opposite surface.

The mechanical properties of the experimental film were substantially the same as those of the control film and also of commonly available polyethylene terephthalate films. The results indicated that the presence of the alumina/silica additive did not affect the coefficient of friction of the film nor its total luminous transmission. The experimental film was visually clearer than the control film and this is demonstrated by the Gardner haze and narrow angle haze value. A sample of the experimental film was coated on one side with a thin layer of aluminium by a conventional vacuum deposition technique. The resulting film was particularly bright and clear and no "blooming" was observed at narrow angles of view when looked at through the film.

I claim:

1. A linear polyester composition which contains 0.01 to 10% by weight of the total composition of an inert particulate additive comprising a mixture of particulate pyrogenic silica and particulate pyrogenic alumina, each of the particulate materials having a mean primary particle size of up to 100 millimicrons.

2. A polyester composition according to claim 1, which contains 0.05 to 0.5% by weight of the particulate additive.

3. A polyester composition according to claim 1, in which the silica and the alumina have a mean particle size of 5 to 40 millimicrons.

4. A polyester composition according to claim 1, in which the particulate additive consists of 30 to 95% by weight of the alumina and 70 to 15% by weight of the silica.

5. A method of producing a polyester composition according to claim 1, which comprises forming a slurry of glycol and the particulate materials and adding the slurry to the polycondensation mixture from which the polyester is produced.

6. A linear polyester composition which contains 0.05 to 0.5% by weight of the total composition of an inert particulate additive comprising 30 to 95 parts by weight of pyrogenic alumina and 70 to 15 parts by weight of pyrogenic silica each having a mean primary particle size of up to 100 millimicrons.

7. A polyester composition according to claim 6, in which the silica and the alumina have a mean particle size of 5 to 40 millimicrons.

8. A method of producing a polyester composition according to claim 6, which comprises forming a slurry of glycol and the particulate materials and adding the slurry to the polycondensation mixture from which the polyester is produced.

9. A shaped article produced from a linear polyester composition according to claim 1.

10. A shaped article produced from a linear polyester composition according to claim 6.

11. A film produced from a linear polyester composition according to claim 1.

12. A film produced from a linear polyester composition according to claim 6.

* * * * *